(12) United States Patent
Shi (10) Patent No.: US 12,342,153 B2
(45) Date of Patent: Jun. 24, 2025

(54) AUDIO PROCESSING METHOD AND APPARATUS, READABLE MEDIUM, AND ELECTRONIC DEVICE

(71) Applicant: Beijing Bytedance Network Technology Co., Ltd., Beijing (CN)

(72) Inventor: Junjie Shi, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 126 days.

(21) Appl. No.: 17/885,468

(22) Filed: Aug. 10, 2022

(65) Prior Publication Data

US 2022/0386061 A1 Dec. 1, 2022

Related U.S. Application Data

(63) Continuation of application No. PCT/CN2021/080298, filed on Mar. 11, 2021.

(30) Foreign Application Priority Data

Mar. 31, 2020 (CN) .......................... 202010245598.6

(51) Int. Cl.
*H04S 7/00* (2006.01)
*G06F 3/01* (2006.01)
*G06T 19/00* (2011.01)

(52) U.S. Cl.
CPC .............. *H04S 7/302* (2013.01); *G06F 3/011* (2013.01); *G06T 19/006* (2013.01); *H04S 2400/11* (2013.01)

(58) Field of Classification Search
CPC ...... H04S 2400/11; H04S 7/302; G06F 3/011; G06T 19/006
See application file for complete search history.

(56) References Cited

U.S. PATENT DOCUMENTS 9,754,397 B1 9/2017 Piemonte et al.
9,891,884 B1 2/2018 Baughman et al.
(Continued)

FOREIGN PATENT DOCUMENTS

CN 101458434 A 6/2009
CN 104067633 A 9/2014
(Continued)

OTHER PUBLICATIONS

First Office Action in CN202010245598.6, mailed Sep. 30, 2022, 8 pages.

(Continued)

*Primary Examiner* — Ping Lee
(74) *Attorney, Agent, or Firm* — Astute IP Law Group (57) ABSTRACT

Provided are an audio processing method and apparatus, a readable medium, and an electronic device. The method includes: acquiring an original image captured by a terminal; determining a three-dimensional relative position of a target object relative to the terminal as a first three-dimensional relative position according to the original image; and performing three-dimensional effect processing on a target sound according to the first three-dimensional relative position to enable a sound source position of the target sound in audio obtained after the three-dimensional effect processing and the first three-dimensional relative position to conform to a positional relationship between the target object and a sound effect object corresponding to the target object, where the target sound is an effect sound corresponding to the sound effect object.

17 Claims, 2 Drawing Sheets

(56) References Cited

U.S. PATENT DOCUMENTS

| | | |
|---|---|---|
| 2009/0262946 A1 | 10/2009 | Dunko |
| 2012/0293663 A1 | 11/2012 | Liu et al. |
| 2013/0041648 A1 | 2/2013 | Osman |
| 2013/0236040 A1 | 9/2013 | Crawford et al. |
| 2015/0068587 A1 | 3/2015 | Lomasney |
| 2016/0212272 A1 | 7/2016 | Srinivasan et al. |
| 2016/0360334 A1 | 12/2016 | Wu et al. |
| 2019/0166446 A1 | 5/2019 | Eronen et al. |
| 2019/0266803 A1 | 8/2019 | Anderson et al. |
| 2019/0387339 A1 | 12/2019 | Lyren et al. |
| 2020/0008004 A1 | 1/2020 | Eronen et al. |
| 2020/0033599 A1 | 1/2020 | Zhou et al. |
| 2020/0169825 A1 | 5/2020 | Gong |
| 2020/0210704 A1* | 7/2020 | Han ................ G06V 10/462 |

FOREIGN PATENT DOCUMENTS

| | | |
|---|---|---|
| CN | 106993249 A | 7/2017 |
| CN | 107168518 A | 9/2017 |
| CN | 109121069 A | 1/2019 |
| CN | 109246580 A | 1/2019 |
| CN | 109327794 A | 2/2019 |
| CN | 109582273 A | 4/2019 |
| CN | 110164464 A | 8/2019 |
| CN | 110639204 A | 1/2020 |
| EP | 3399398 A1 | 11/2018 |
| IN | 201927022200 A | 1/2020 |
| JP | 2008158640 A | 7/2008 |
| JP | 2013162285 A | 8/2013 |
| JP | 2019097162 A | 6/2019 |
| JP | 2021514141 A | 6/2021 |
| KR | 101381396 B1 | 4/2014 |
| KR | 20190004501 A | 1/2019 |
| WO | 2015068587 A1 | 5/2015 |
| WO | 2017185762 A1 | 11/2017 |
| WO | 2019161314 A1 | 8/2019 |

OTHER PUBLICATIONS

Forsyth, "A Method for Virtual Acoustic Auralisation in VR," 2018 Conference on Interaction with Sound Audio Mostly: Sound in Immersion and Emotion, Dec. 31, 2018, pp. 1-3.

Li et al., "Design and Implementation of an Interactive Display," China Academic Journal Electronic Publishing House, Jun. 15, 2018, pp. 1-67.

Notification of Grant of Patent Rights for Invention Application in CN202010245598.6, mailed Feb. 2, 2024, 10 pages.

Office Action in JP2022559616, mailed Nov. 28, 2023, 10 pages.

Yang et al., "Research on 3D Sound Effect Based on OpenAL," Journal of Hubei University of Technology, Apr. 15, 2009, vol. 24, No. 2, pp. 43-46.

International Search Report issued in corresponding International Application No. PCT/CN2021/080298 dated Jun. 9, 2021, 16 pages.

Partial Supplementary European Search Report in EP21779885.9, mailed Jul. 20, 2023, 16 pages.

Request for the Submission of an Opinion for Korean Patent Application No. 10-2022-7035410, mailed on Oct. 28, 2024, 17 pages.

Extended European Search Report for European Patent Application No. 21779885.9, mailed on Oct. 23, 2023, 15 Pages.

Written Opinion for PCT/CN2021/080298, mailed on Jun. 9, 2021, 9 Pages.

\* cited by examiner

AUDIO PROCESSING METHOD AND APPARATUS, READABLE MEDIUM, AND ELECTRONIC DEVICE

CROSS-REFERENCE TO RELATED APPLICATIONS

This application is a continuation of International Application No. PCT/CN2021/080298, filed on Mar. 11, 2021, which claims a priority of the Chinese Patent Application No. 202010245598.6, filed on Mar. 31, 2020 to China National Intellectual Property Administration, and entitled "AUDIO PROCESSING METHOD AND APPARATUS, READABLE MEDIUM, AND ELECTRONIC DEVICE". Both of the aforementioned patent applications are hereby incorporated by reference in their entireties.

TECHNICAL FIELD

The present disclosure relates to the field of computer technology and, in particular, to an audio processing method and apparatus, a readable medium, and an electronic device.

BACKGROUND

Augmented reality (AR) emphasizes the combination of virtuality and reality. As a new trend to play with short video applications, AR enables users to interact with the real world. For example, when a specific object is shot, special effects corresponding to the object are displayed. At present, AR products can visually combine virtuality with reality for users. However, for special effects with sound, users are prone to a "sense of dislocation" when perceiving environment and sound. For example, if a specific audio is preset to be played when a certain object is recognized, the mobile phone will play the specific audio when the object is shot through the mobile phone by the user, but when the user gradually moves away from or approaches the object, the sound that the user hears will not change. If the user moves away from the object gradually, the sound that the user hears should become smaller within the common sense cognition of the user, but in fact, the user can always hear the same loud sound, this is inconsistent with the users cognition, resulting in occurrence of a "sense of dislocation" for the user, and thereby affecting the users experience and reducing the immersion of the user in AR scenarios.

SUMMARY

This summary is provided to present ideas in a brief form, and these ideas will be described in detail in the following section about the description of embodiments. This summary is not intended to identify key features or essential features of the technical solutions claimed to be protected, nor is it intended to be used to limit the scope of the technical solutions claimed to be protected.

In a first aspect, the present disclosure provides an audio processing method, including:
  acquiring an original image captured by a terminal;
  determining a three-dimensional relative position of a target object relative to the terminal as a first three-dimensional relative position according to the original image; and
  performing three-dimensional effect processing on a target sound according to the first three-dimensional relative position to enable a sound source position of the target sound in audio obtained after the three-dimensional effect processing and the first three-dimensional relative position to conform to a positional relationship between the target object and a sound effect object corresponding to the target object, where the target sound is an effect sound corresponding to the sound effect object.

In a second aspect, the present disclosure provides an audio processing apparatus, including:
  a first acquiring module, configured to acquire an original image captured by a terminal;
  a first determining module, configured to determine a three-dimensional relative position of a target object relative to the terminal as a first three-dimensional relative position according to the original image; and
  an audio processing module, configured to perform three-dimensional effect processing on a target sound according to the first three-dimensional relative position to enable a sound source position of the target sound in audio obtained after the three-dimensional effect processing and the first three-dimensional relative position to conform to a positional relationship between the target object and a sound effect object corresponding to the target object, where the target sound is an effect sound corresponding to the sound effect object.

In a third aspect, the present disclosure provides a computer readable storage medium having a computer program stored thereon, where the program, when executed by a processing apparatus, implements steps of the method of the first aspect of the present disclosure.

In a fourth aspect, the present disclosure provides an electronic device, including:
  a storage apparatus, having a computer program stored thereon; and
  a processing apparatus, configured to execute the computer program in the storage apparatus to implement steps of the method of the first aspect of the present disclosure.

In a fifth aspect, the present disclosure provides a computer program product, where the program product includes a computer program, which, when executed by a processing apparatus, implements steps of the method of the first aspect of the present disclosure.

In a sixth aspect, the present disclosure provides a computer program, which, when executed by a processing apparatus, implements steps of the method of the first aspect of the present disclosure.

By means of the above technical solutions, an original image captured by a terminal is acquired, a three-dimensional relative position of a target object relative to the terminal is determined as a first three-dimensional relative position according to the original image, and three-dimensional effect processing is performed on a target sound according to the first three-dimensional relative position to enable a sound source position of the target sound in audio obtained after the three-dimensional effect processing and the first three-dimensional relative position to conform to a positional relationship between the target object and a sound effect object corresponding to the target object, where the target sound is an effect sound corresponding to the sound effect object. Therefore, the three-dimensional effect processing can be performed on the target sound based on the three-dimensional relative position of the target object relative to the terminal, and thus to the user, the obtained audio is more in conformance with a real-time position where the terminal is located. Furthermore, based on this manner, in the process of the terminal continuously capturing images, audio with a three-dimensional effect that conforms to the real-time position of the terminal can be continuously generated, and changes adaptively with the change of the terminal position, and then a user holding the terminal in hand can hear audio with a sense of space that conforms to a current moving tendency, thus immersive experience of the user in a virtual scenario will be improved.

Other features and advantages of the present disclosure will be described in detail in the following section about the description of embodiments.

BRIEF DESCRIPTION OF THE DRAWINGS

The above and other features, advantages, and aspects of the embodiments of the present disclosure will become more apparent in conjunction with the drawings and with reference to the following description of embodiments. Throughout the drawings, the same or similar reference signs indicate the same or similar elements. It should be understood that the drawings are illustrative, and the components and elements are not necessarily drawn to scale. In the drawings.

DESCRIPTION OF EMBODIMENTS

Embodiments of the present disclosure will be described in greater detail below with reference to the drawings. Although some embodiments of the present disclosure are shown in the drawings, it should be understood that the present disclosure may be implemented in various forms and should not be construed as limited to the embodiments set forth herein. Rather, these embodiments are provided for a more thorough and complete understanding of the present disclosure. It should be understood that the drawings and embodiments of the present disclosure are only for illustrative purposes and are not intended to limit the scope of protection of the present disclosure.

It should be understood that steps described in the method implementations of the present disclosure can be executed in a different order and/or in parallel. In addition, additional steps may be included and/or execution of the shown steps may be omitted in the method implementations. The scope of the present disclosure is not limited in this respect.

As used herein, the term "include" and its variations are open-ended inclusion, i.e., "including but not limited to". The term "based on" means "based at least in part on". The term "one embodiment" means "at least one embodiment"; the term "another embodiment" means "at least one other embodiment"; and the term "some embodiments" means "at least some embodiments". Relevant definitions of other terms will be given in the following description.

Note that the concepts "first", "second", etc., mentioned in the present disclosure are only used to distinguish between different apparatuses, modules or units, and are not intended to limit the order or interdependence of the functions performed by these apparatuses, modules or units.

It should be noted that the modifications of "one" and "a plurality of" mentioned in the present disclosure are illustrative but not restrictive, and it should be understood by those skilled in the art that, they should be understood as "one or more" unless otherwise clearly indicated in the context.

The names of messages or information interchanged between a plurality of apparatuses in the implementations of the present disclosure are only for illustrative purposes and are not intended to limit the scope of those messages or information.

Figure 1:
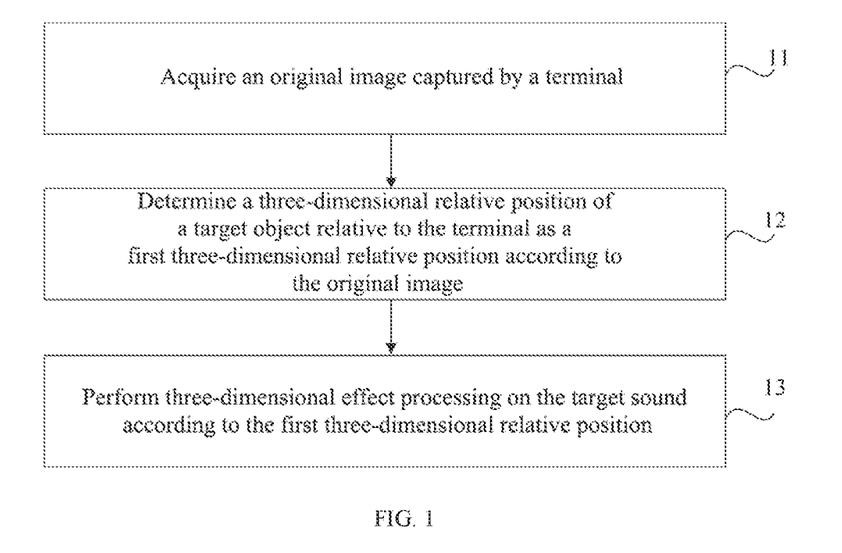
FIG. 1 is a flowchart of an audio processing method provided according to an implementation of the present disclosure.

FIG. 1 is a flowchart of an audio processing method provided according to an implementation of the present disclosure. As shown in FIG. 1, this method can include the following steps.

In step 11, acquire an original image captured by a terminal.

The terminal can capture images through an apparatus with a shooting function (e.g., a camera installed in the terminal). Exemplarily, when a user opens a shooting program of the terminal, the viewfinder displayed on the screen (e.g., AR viewfinder) will continuously capture contents in the viewfinder, i.e., continuously capture images. The specific capturing manner can be, for example, after the viewfinder is opened, performing periodic capturing (the period may be preset according to an empirical value), and automatically capturing the content currently in the viewfinder upon arrival at each capturing moment. In actual application scenarios, if the terminal's viewfinder is opened, from the opening of the viewfinder to the closing of the viewfinder, capturing may be performed many times during the process, and a corresponding image can be captured every time, where each captured image can be used as an original image.

In step 12, determine a three-dimensional relative position of a target object relative to the terminal as a first three-dimensional relative position according to the original image.

Through the original image, the three-dimensional relative position of the target object relative to the terminal can be determined. Here, the target object may be an object that exists in the original image, or the target object may also be an object that does not appear in the original image (provided that the terminal has shot the target object in the historical shooting before the original image was shot in a same shooting process, and the target object is only temporarily "out of the picture" in the original image during the process of shooting and moving of the terminal).

In application scenarios provided by the present disclosure, it is considered that a target object corresponds to a sound effect object, and the sound effect object corresponds to an effect sound (how the target object, the sound effect object and the effect sound correspond to each other can be preset). The effect is represented such that; the effect sound of the sound effect object corresponding to the target object is played when it is determined that the target object exists, and the sound source position of the sound (i.e., the position of the effect sound) heard by the user should satisfy the user's cognition.

Among which, the sound effect object can be in the same position as the target object or in a different position (e.g., around the target object). For example, if it is set such that a sound of aircraft flying is played when building A is recognized and the aircraft flies from the left side of building A to the right side of building A, then the target object is building A, the sound effect object is the aircraft, and the effect sound is the sound of aircraft flying. It can be seen that in this example, the sound effect object and the target object are not in the same position, but the sound effect object moves from the left side of the target object to the right side of the target object. For another example, if it is set such that an introduction voice of building B is played when building B is recognized, then the target object is building B, the sound effect object is building B, and the effect sound is the introduction voice of building B. It can be seen that in this example, the sound effect object is at the same position as the target object.

In actual scenarios, it is necessary to play a sound when it is determined that there is a target object (e.g., the target object is in the picture, or the target object is temporarily "out of the picture"). The purpose of this solution is to process audio with an invariable playing effect into audio with more sense of space, where the spatial position is indispensable for creating the sense of space, and further, the spatial position required for creating the sense of space is naturally the three-dimensional relative position of the target object relative to the terminal, i.e., the first three-dimensional relative position.

Figure 2:
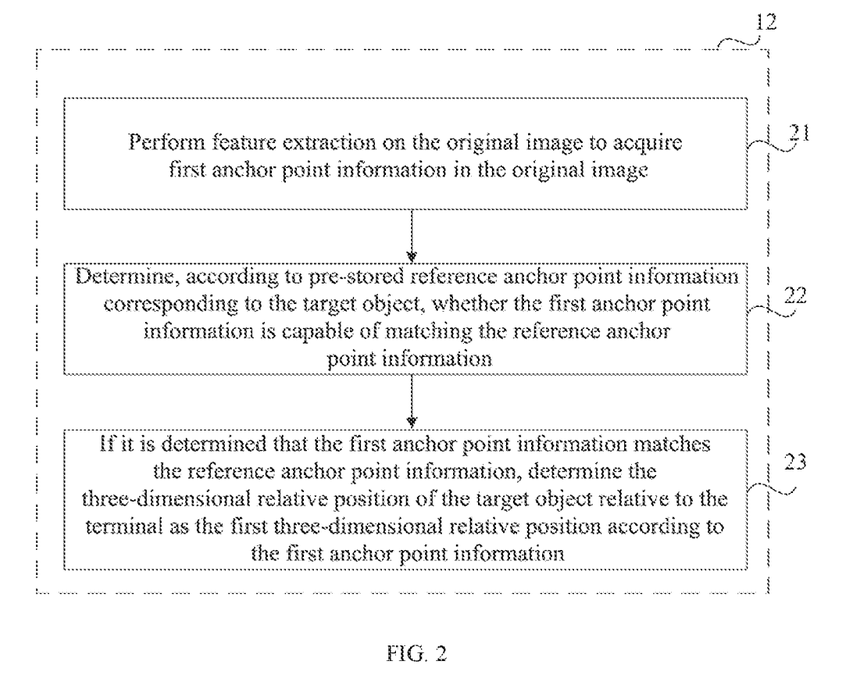
FIG. 2 is an exemplary flowchart of steps of determining a three-dimensional relative position of a target object relative to a terminal according to an original image in an audio processing method provided according to the present disclosure.

In a possible implementation, step 12 may include the following steps, as shown in FIG. 2.

In step 21, perform feature extraction on the original image to acquire first anchor point information in the original image.

The first anchor point information may include at least one anchor point (i.e., feature point) in the original image recognized after the feature extraction is performed on the original image, where the method for feature extraction is a conventional means in this field, which will not be repeated herein.

In step 22, determine, according to pre-stored reference anchor point information corresponding to the target object, whether the first anchor point information is capable of matching the reference anchor point information.

In actual application scenarios, if there is a target object in the image, special effects, sounds and the like corresponding to the target object can be presented. For example, if the target object is a bell tower, and it is set such that when there is a bell tower in the image, a clock animation is displayed and a bell sound is played, then when the original image contains the bell tower, a clock should be attached to the bell tower and the bell sound should be played at the same time.

The target object is a modeled object. In an early stage of data processing, firstly, feature extraction is performed on a series of images containing the target object, and the reference anchor point information of the target object is determined and stored, where the reference anchor point information of the target object includes at least one anchor point that can assist in recognizing the target object. Exemplarily, if the target object is a desk, firstly, a large number of images containing the desk are collected, and then based on the collected images, feature extraction is performed on each image to obtain feature points that can characterize the desk, so as to determine reference anchor point information corresponding to the desk and store it in association with the object, i.e., the desk. In practical applications, an anchor point information database can be constructed, where the reference anchor point information corresponding to all modeled objects is stored, so as to enable a faster determination on whether a target object exists and what kind of target object exists in the original image.

As described above, the reference anchor point information of the target object can well assist in recognizing the target object. Therefore, by comparing the first anchor point information with the reference anchor point information, it is possible to determine whether there is an object similar to the target object in the original image, so as to determine whether the target object exists in the original image. Specifically, it is possible to determine whether the first anchor point information matches the reference anchor point information. Exemplarily, a similarity between the first anchor point information and the reference anchor point information can be calculated. If the similarity between the first anchor point information and the reference anchor point information is higher than a similarity threshold (which can be set according to an empirical value), it is determined that they two are matched; whereas if the similarity between the first anchor point information and the reference anchor point information does not reach the similarity threshold, it is determined that they two are not matched. The similarity between the first anchor point information and the reference anchor point information can be calculated using a conventional calculation manner such as cosine similarity or the like, which will not be repeated herein.

In step 23, if it is determined that the first anchor point information matches the reference anchor point information, determine the three-dimensional relative position of the target object relative to the terminal as the first three-dimensional relative position according to the first anchor point information.

If it is determined in step 22 that the first anchor point information matches the reference anchor point information, it means that there is a target object in the original image, and the target object is one of the pre-stored objects. Therefore, the three-dimensional relative position of the target object relative to the terminal, i.e., the first three-dimensional relative position, can be determined directly according to the first anchor point information of the original image. It is a conventional means in the art to determine, according to an image and a certain point (or, a plurality of points) in the image, a three-dimensional relative position of the point relative to a terminal shooting the image, which will not be further described herein. For example, for the iOS system, the above data processing can be done by using interfaces such as ARKit and ARCore.

In another possible implementation, step 12 may include the following steps:
if second anchor point information generated from an anchor point marking operation performed by a user on the original image is acquired, determining the three-dimensional relative position of the target object relative to the terminal as the first three-dimensional relative position according to the second anchor point information.

Among which, the second anchor point information may include at least one anchor point generated from the anchor point marking operation performed by a user on the original image. In this implementation, the user can manually perform an anchor point marking operation within the viewfinder, i.e., it is no longer necessary to perform complicated picture analysis on the original image, but to determine the target object corresponding to the second anchor point information in the original image based on the second anchor point information generated from the user's anchor point marking operation. Exemplarily, according to the second anchor point information, a range can be delineated in the original image, and the content contained in the range is considered as the target object. In the subsequent image capturing, the positioning for the target object can be based on this. For example, if the anchor point marked by the user is in the true center of the original image, the currently determined target object is the content corresponding to the center of the original image. In subsequent capturing moments, if the terminal moves, for example, the terminal moves to the upper left, positioning for the target object moves to the lower right, instead of still being in the center.

Determining the first three-dimensional relative position according to the second anchor point information is similar to step 23, i.e., the three-dimensional relative position of the target object relative to the terminal is directly determined as the first three-dimensional relative position according to the second anchor point information of the original image. As described above, it is a conventional means in the art to determine, according to an image and a certain point (or, a plurality of points) in the image, a three-dimensional relative position of the point to a terminal shooting the image. For example, for the iOS system, the above data processing can be done by using interfaces such as ARKit and ARCore.

By adopting the above manner, the user can directly locate the target object without performing complex analysis and calculation on the image, which can effectively reduce the amount of data processing, provide users with higher flexibility, and improve user experience.

In another possible implementation, step 12 may include the following steps:

if the target object does not exist in the original image, acquiring historical motion trajectory information corresponding to the target object; and determining the three-dimensional relative position of the target object relative to the terminal as the first three-dimensional relative position according to the historical motion trajectory information.

As described above, in the process of shooting and moving of the terminal, the target object may be temporarily "out of the picture" due to the movement of the terminal. In this situation, although the target object does not appear in the original image, the three-dimensional relative position of the target object relative to the terminal can still be obtained.

If the target object does not exist in the original image, it means that the target object may temporarily move out of the shooting viewfinder of the terminal at this time, thus the historical motion trajectory information corresponding to the target object can be obtained, where the historical motion trajectory information is obtained by performing motion tracking on an image captured by the terminal before the original image is acquired.

Through the historical motion trajectory information, the relative position of the target object to the terminal can be inferred when the terminal captures the original image. For example, the moving direction and speed of the target object can be determined through the historical motion trajectory information of the target object, so that taking the position of the target object in the last frame of image with the target object before the original image is acquired as a starting point, the three-dimensional relative position of the target object relative to the terminal can be determined as the first three-dimensional relative position according to the moving direction and speed of the target object in the historical motion trajectory and the shooting time difference between the last frame of image with the target object and the original image.

By adopting the above manner, in the case where the target object is not shot by the terminal, the three-dimensional relative position of the target object relative to the terminal can also be determined by performing motion tracking on the target object based on history, so as to avoid the influence of the movement of the terminal on the position determination of the target object.

Referring back to FIG. 1, in step 13, perform three-dimensional effect processing on the target sound according to the first three-dimensional relative position.

Three-dimensional effect processing is performed on the target sound according to the first three-dimensional relative position to enable the sound source position of the target sound in audio obtained after the three-dimensional effect processing and the first three-dimensional relative position to conform to the positional relationship between the target object and the sound effect object corresponding to the target object.

Among which, the target sound is an effect sound corresponding to the sound effect object.

In a possible implementation, step 13 may include the following steps:

determining the three-dimensional relative position of the sound source position of the target sound relative to the terminal as a second three-dimensional relative position according to the first three-dimensional relative position and the positional relationship between the target object and the sound effect object corresponding to the target object; and performing three-dimensional effect processing on the target sound according to the second three-dimensional relative position to enable the sound source position of the target sound in the audio obtained after the three-dimensional effect processing and the first three-dimensional relative position to conform to the positional relationship between the target object and the sound effect object corresponding to the target object.

The sound effect object corresponding to the target object can be one or multiple. If there are multiple sound effect objects corresponding to the target object, each sound effect object has its own positional relationship with the target object.

According to the first three-dimensional relative position and the positional relationship between the target object and the sound effect object corresponding to the target object, the three-dimensional relative position of the target object relative to the terminal and the three-dimensional relative position of the target object relative to the sound source of the sound effect object (i.e., the sound source position of the target sound) are all known, so that the three-dimensional relative position of the terminal relative to the sound source of the sound effect object (i.e., the sound source position of the target sound), i.e., the second three-dimensional relative position, can be easily determined. Thereafter, according to the second three-dimensional relative position, three-dimensional effect processing is performed on the target sound to obtain audio after the three-dimensional effect processing, and the sound source position of the target sound in the audio obtained after the three-dimensional effect processing and the first three-dimensional relative position conform to the positional relationship between the target object and the sound effect object corresponding to the target object.

Among which, 3D sound rendering can be used for the three-dimensional effect processing on the target sound. Exemplarily, the 3D sound rendering can use an ambisonic technology, which is a conventional means in the field, and according to which the sound image position of the audio in space can be simulated based on the audio and position information so as to generate a playing signal corresponding to ears.

In another possible implementation, the method provided by the present disclosure may further include the following steps:

acquiring additional description information of the target sound.

Among which, the additional description information includes but not limited to at least one of a sound source sounding area of the target sound, a sound source reverberation effect of the target sound and a sound source environment of the target sound;

the sound source sounding area of the target sound can affect the volume of the audio. For example, if the sound source sounding area is small, the volume will be low, which can refer to small objects such as mobile phones. For another example, if the sound source sounding area is large, the sound volume will be high, which can refer to large objects such as buildings. The sound source reverberation effect of the target sound can affect the reverberation effect of the audio, i.e., whether there is a reverberation effect or not. The sound source environment of the target sound can affect the environmental effect of the audio, for example, the sound source of the target sound is indoors or outdoors.

In an implementation, the performing three-dimensional effect processing on the target sound according to the second three-dimensional relative position to enable the sound source position of the target sound in the audio obtained after the three-dimensional effect processing and the first three-dimensional relative position to conform to the positional relationship between the target object and the sound effect object corresponding to the target object may include the following steps:

performing the three-dimensional effect processing on the target sound according to the second three-dimensional relative position and the additional description information to enable the sound source position of the target sound in the audio obtained after the three-dimensional effect processing and the first three-dimensional relative position to conform to the positional relationship between the target object and the sound effect object corresponding to the target object.

In this implementation, various sound processing manners, such as 3D sound rendering, reverberation effect, volume adjustment, indoor and outdoor effects, etc., are actually combined to obtain processed audio. Exemplarily, if the additional description information of the target sound is the sound source sounding area of the target sound being small, then when the three-dimensional processing is performed on the target sound, the volume of the audio of the target sound source will be reduced while 3D sound rendering is performed on the audio of the target sound source.

By means of the above-described technical solution, an original image captured by a terminal is acquired, a three-dimensional relative position of a target object relative to the terminal is determined as a first three-dimensional relative position according to the original image, and three-dimensional effect processing is performed on a target sound according to the first three-dimensional relative position to enable a sound source position of the target sound in audio obtained after the three-dimensional effect processing and the first three-dimensional relative position to conform to a positional relationship between the target object and a sound effect object corresponding to the target object, where the target sound is an effect sound corresponding to the sound effect object. Therefore, the three-dimensional effect processing can be performed on the target sound based on the three-dimensional relative position of the target object relative to the terminal, and thus to the user, the obtained audio is more in conformance with a real-time position where the terminal is located. Furthermore, based on this manner, in the process of the terminal continuously capturing images, audio with a three-dimensional effect that conforms to the real-time position of the terminal can be continuously generated, and changes adaptively with the change of the terminal position, and then a user holding the terminal in hand can hear audio with a sense of space that conforms to a current moving tendency, thus immersive experience of the user in a virtual scenario will be improved.

In an embodiment, on the basis of each of the above embodiments, the method provided by the present disclosure may further include the following steps:

superimposing image material corresponding to the target object to the first three-dimensional relative position of the original image to generate an AR image corresponding to the original image; and displaying the AR image.

This embodiment describes a scenario related to AR image special effects. Each target object can correspond to image material. For example, a building corresponds to the content that can be attached to the outside of the building, and this content is the image material corresponding to the building. Therefore, on the basis of audio processing, in order to ensure the user's visually immersive experience, the image material corresponding to the target object can be superimposed to the first three-dimensional relative position of the original image to generate an AR image corresponding to the original image, and the AR image is displayed (the original image is not displayed at the same time) to enhance the user's visual experience.

Furthermore, the generated AR image can be displayed through the terminal, and the audio obtained by performing the three-dimensional effect processing on the target sound can be played through the terminal. Exemplarily, the terminal can display the AR image corresponding to the captured original image in real time during the user's framing process, and play the audio obtained after the three-dimensional effect processing in real time. For another example, the terminal can also execute the audio processing method provided by the present disclosure respectively based on the captured images, obtain AR images corresponding to the respective images and audio obtained through the three-dimensional effect processing corresponding to the respective images, and synthesize a video and store it for subsequent viewing by users (this function can be set to be triggered by users).

In an embodiment, since the method provided by the present disclosure is to improve the immersion of the user in the virtual scenario through sound processing, and if the terminal held by the user cannot provide audio with a sense of space to the user, then there is no need to play the audio so as to avoid unnecessary data interaction for the terminal. Therefore, the method provided by the present disclosure may further include the following steps:

determining whether the terminal meets an ambisonic playing condition; and if it is determined that the terminal meets the ambisonic playing condition, playing the audio obtained after the three-dimensional effect processing.

Exemplarily, determining whether the terminal meets the ambisonic playing condition can be determined by identifying whether the terminal is plugged with a two-channel earphone. If the terminal is plugged with a two-channel earphone, it can be determined that the terminal meets the ambisonic playing condition.

By adopting the above manner, it can be ensured in the present disclosure that audio with a sense of space is played on the premise that the terminal can provide an ambisonic playing condition, so as to avoid unnecessary data interaction for the terminal.

Figure 3:
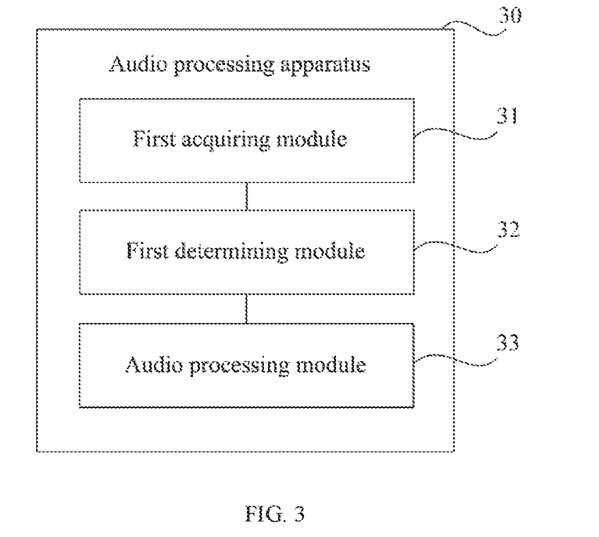
FIG. 3 is a block diagram of an audio processing apparatus provided according to an implementation of the present disclosure.

FIG. 3 is a block diagram of an audio processing apparatus provided according to an implementation of the present disclosure. As shown in FIG. 3, the apparatus 30 includes:
- a first acquiring module 31, configured to acquire an original image captured by a terminal;
- a first determining module 32, configured to determine a three-dimensional relative position of a target object relative to the terminal as a first three-dimensional relative position according to the original image; and
- an audio processing module 33, configured to perform three-dimensional effect processing on a target sound according to the first three-dimensional relative position to enable a sound source position of the target sound in audio obtained after the three-dimensional effect processing and the first three-dimensional relative position to conform to a positional relationship between the target object and a sound effect object corresponding to the target object, where the target sound is an effect sound corresponding to the sound effect object.

In an embodiment, the first determining module 32 includes:
- a first acquiring submodule, configured to perform feature extraction on the original image to acquire first anchor point information in the original image;
- a determining submodule, configured to determine, according to pre-stored reference anchor point information corresponding to the target object, whether the first anchor point information is capable of matching the reference anchor point information; and
- a first determining submodule, configured to determine the three-dimensional relative position of the target object relative to the terminal as the first three-dimensional relative position according to the first anchor point information if it is determined that the first anchor point information matches the reference anchor point information.

In an embodiment, the first determining module 32 includes:
- a second determining submodule, configured to determine the three-dimensional relative position of the target object relative to the terminal as the first three-dimensional relative position according to second anchor point information if the second anchor point information generated from an anchor point marking operation performed by a user on the original image is acquired.

In an embodiment, the first determining module 32 includes:
- a second acquiring submodule, configured to acquire historical motion trajectory information corresponding to the target object if the target object does not exist in the original image, where the historical motion trajectory information is obtained by performing motion tracking on an image captured by the terminal before the original image is acquired; and
- a third determining submodule, configured to determine the three-dimensional relative position of the target object relative to the terminal as the first three-dimensional relative position according to the historical motion trajectory information.

In an embodiment, the audio processing module 33 includes:
- a fourth determining submodule, configured to determine the three-dimensional relative position of the sound source position of the target sound relative to the terminal as a second three-dimensional relative position according to the first three-dimensional relative position and the positional relationship between the target object and the sound effect object corresponding to the target object; and
- an audio processing submodule, configured to perform three-dimensional effect processing on the target sound according to the second three-dimensional relative position to enable a sound source position of the target sound in audio obtained after the three-dimensional effect processing and the first three-dimensional relative position to conform to a positional relationship between the target object and a sound effect object corresponding to the target object.

In an embodiment, the apparatus 30 further includes:
- a second acquiring module, configured to acquire additional description information of the target sound, where the additional description information includes at least one of a sound source sounding area of the target sound, a sound source reverberation effect of the target sound and a sound source environment of the target sound; and
- the audio processing submodule is configured to perform the three-dimensional effect processing on the target sound according to the second three-dimensional relative position and the additional description information to enable the sound source position of the target sound in the audio obtained after the three-dimensional effect processing and the first three-dimensional relative position to conform to the positional relationship between the target object and the sound effect object corresponding to the target object.

In an embodiment, the apparatus 30 further includes:
- an image processing module, configured to superimpose image material corresponding to the target object to the first three-dimensional relative position of the original image to generate an AR image corresponding to the original image; and
- an image display module, configured to display the AR image.

In an embodiment, the apparatus 30 further includes:
- a second determining module, configured to determine whether the terminal meets an ambisonic playing condition; and
- an audio playing module, configured to play the audio obtained after the three-dimensional effect processing if it is determined that the terminal meets the ambisonic playing condition.

With regard to the apparatuses in the above embodiments, the specific manners in which each module performs operations have been described in detail in the embodiments of the related method, and will not be explained in detail herein.

Figure 4:
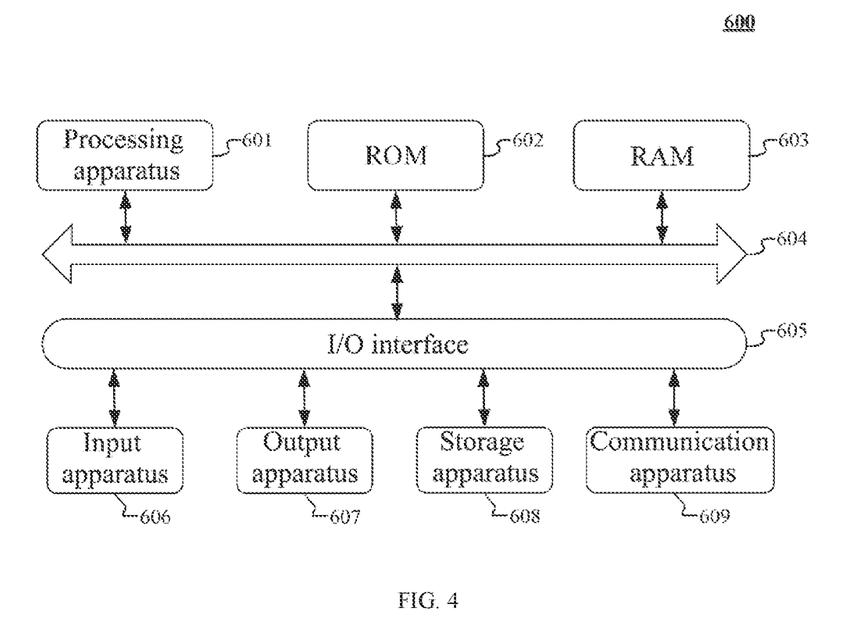
FIG. 4 shows a schematic structural diagram of an electronic device suitable for implementing an embodiment of the present disclosure.

Referring to FIG. 4 below, it shows a structural schematic diagram of an electronic device 600 suitable for implementing an embodiment of the present disclosure. The terminal device in embodiments of the present disclosure may include, but is not limited to a mobile terminal such as a mobile phone, a notebook computer, a digital broadcast receiver, a personal digital assistant (PDA), a portable android device (PAD), a portable multimedia player (PMP), an in-vehicle terminal (e.g., an in-vehicle navigation terminal), and a fixed terminal such as a digital television (TV) and a desktop computer. The electronic device shown in FIG. 4 is only an example, which should not bring any limitation to the function and the use range of the embodiments of the present disclosure.

As shown in FIG. 4, the electronic device 600 may include a processing apparatus (such as a central processor and a graphics processor, etc.) 601, which may execute various appropriate actions and processes according to programs stored in a read only memory (ROM) 602 or programs loaded into a random access memory (RAM) 603 from a storage apparatus 608. In the RAM 603, various programs and data necessary for the operation of the electronic device 600 are also stored. The processing apparatus 601, the ROM 602, and the RAM 603 are connected to each other through a bus 604. An input/output (I/O) interface 605 is also connected to the bus 604.

Usually, the following apparatuses can be connected to the I/O interface 605: an input apparatus 606, including, for example, a touch screen, a touch pad, a keyboard, a mouse, a camera, a microphone, an accelerometer, a gyroscope, etc.; an output apparatus 607, including, for example, a liquid crystal display (LCD), a speaker, a vibrator, etc.; a storage apparatus 608, including, for example, a magnetic tape, a hard disk, etc.; and a communication apparatus 609. The communication apparatus 609 may allow the electronic device 600 to communicate wirelessly or wiredly with other devices to exchange data. Although FIG. 4 shows the electronic device 600 having various apparatuses, it should be understood that it is not required to implement or have all of the illustrated apparatuses. More or fewer apparatuses may alternatively be implemented or provided.

In particular, according to the embodiments of the present disclosure, the processes described above with reference to the flowcharts can be implemented as a computer software program. For example, an embodiment of the present disclosure includes a computer program product including a computer program carried on a non-transitory computer readable medium, where the computer program contains program codes for executing the method shown in the flowcharts. In such embodiment, the computer program can be downloaded and installed from a network through the communication apparatus 609, or installed from the storage apparatus 608 or installed from the ROM 602. When the computer program is executed by the processing apparatus 601, the above functions defined in the method of the embodiments of the present disclosure are executed.

It should be noted that the above computer readable medium in the present disclosure can be a computer readable signal medium or a computer readable storage medium or any combination of the two. The computer readable storage medium may be, for example, but not limited to, an electrical, magnetic, optical, electromagnetic, infrared, or semiconductive system, apparatus or means, or any combination of the foregoing. More specific examples of computer readable storage medium may include, but are not limited to, an electrically connected portable computer disk with one or more wires, a hard disk, a random access memory (RAM), a read-only memory (ROM), an erasable programmable read-only memory (EPROM or flash memory), an optical fiber, a compact disk read-only memory (CD-ROM), an optical storage means, an magnetic storage means, or any suitable combination of the forgoing. In the present disclosure, the computer readable storage medium can be any tangible medium in which a program is contained or stored, where the program can be used by or in connection with an instruction execution system, an apparatus or a means. Further, in the present disclosure, the computer readable signal medium may include a data signal propagated in a baseband or as a part of a carrier wave, in which computer readable program codes are carried. Such a propagated data signal may take a variety of forms, including but not limited to an electromagnetic signal, an optical signal, or any suitable combination of the foregoing. The computer readable signal medium may also be any computer readable medium other than the computer readable storage medium, where the computer readable signal medium can transmit, propagate, or transport the program for use by or in combination with an instruction execution system, an apparatus, or a means. The program code contained on the computer readable medium can be transmitted by any suitable medium, including but not limited to an electric wire, an optical cable, radio frequency (RF), etc., or any suitable combination of the foregoing.

In some implementations, a client and a server may communicate using any currently known network protocols such as HyperText Transfer Protocol (HTTP) or future developed network protocols and may interconnect with any form or medium of digital data communication (e.g., a communications network). Examples of the communication network include a local area network (LAN), a wide area network (WAN), an inter-network (e.g., the Internet), and a peer-to-peer network (e.g., an ADaptive Heuristic for Opponent Classification (ad-hoc) peer-to-peer network), as well as any currently known or future developed networks.

The above computer readable medium may be included in the above electronic device, or may exist alone without being assembled into the electronic device.

The computer readable medium carries one or more programs, and the one or more programs, when being executed by the electronic device, causes the electronic device to: acquire an original image captured by a terminal; determine a three-dimensional relative position of a target object relative to the terminal as a first three-dimensional relative position according to the original image; and perform three-dimensional effect processing on a target sound according to the first three-dimensional relative position to enable a sound source position of the target sound in audio obtained after the three-dimensional effect processing and the first three-dimensional relative position to conform to a positional relationship between the target object and a sound effect object corresponding to the target object where the target sound is an effect sound corresponding to the sound effect object.

The computer program codes for executing the operations of the present disclosure can be written in one or more programming languages or a combination thereof, where the above programming languages include but are not limited to object-oriented programming languages such as Java, Smalltalk and C++, and also include conventional procedural programming languages such as "C" language or similar programming languages. The program codes may be executed entirely on a user computer, partly on a user computer, as a stand-alone software package, partly on a user computer and partly on a remote computer, or entirely on a remote computer or a server. In a case involving a remote computer, the remote computer may be connected to a user computer through any kind of network, including a local area network (LAN) or a wide area network (WAN), or may be connected to an external computer (e.g., be connected via the Internet with use of an Internet service provider).

The flowcharts and block diagrams in the drawings illustrate architecture, functions, and operations that may be implemented by the system, the method, and the computer program product in accordance with various embodiments of the present disclosure. At this regard, each block in the flowcharts or the block diagrams may represent a module, a program segment, or a portion of codes that contains one or more executable instructions for implementing a specified logical function. It should also be noted that in some alternative implementations, the functions indicated in the blocks may also occur in an order different from those indicated in the drawings. For example, two blocks shown one after the other can actually be executed in parallel substantially, or they may sometimes be executed in an opposite order, depending on involved functions. It should still be noted that each block in the block diagrams and/or flowcharts, and a combination of blocks in the block diagrams and/or flowcharts, may be implemented with a dedicated hardware-based system that performs a specified function or operation, or may be implemented with a combination of dedicated hardware and computer instructions.

An involved module described in the embodiments of the present disclosure can be implemented by software or hardware, where a name of the module does not constitute a limitation on the module itself in some cases. For example, a first acquiring module can also be described as "a module acquiring an original image captured by a terminal".

The above functions described herein may be performed, at least in part, by one or more hardware logic components. For example, without limitation, exemplary types of hardware logic components that can be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium in which a program for use by or in connection with an instruction execution system, an apparatus or a device may be contained or stored. The machine-readable medium may be a machine-readable signal medium or a machine-readable storage medium. The machine-readable medium may include, but is not limited to, an electronic, magnetic, optical, electromagnetic, infrared, or semiconductive system, apparatus, or device, or any suitable combinations of the foregoing. More specific examples of the machine-readable storage medium might include an electrically connected portable computer disk based on one or more wires, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

According to one or more embodiments of the present disclosure, there is provided an audio processing method, including:
  acquiring an original image captured by a terminal:
  determining a three-dimensional relative position of a target object relative to the terminal as a first three-dimensional relative position according to the original image; and
  performing three-dimensional effect processing on a target sound according to the first three-dimensional relative position to enable a sound source position of the target sound in audio obtained after the three-dimensional effect processing and the first three-dimensional relative position to conform to a positional relationship between the target object and a sound effect object corresponding to the target object, where the target sound is an effect sound corresponding to the sound effect object.

According to one or more embodiments of the present disclosure, there is provided an audio processing method, where the determining the three-dimensional relative position of the target object relative to the terminal as the first three-dimensional relative position according to the original image includes:
  performing feature extraction on the original image to acquire first anchor point information in the original image:
  determining, according to pre-stored reference anchor point information corresponding to the target object, whether the first anchor point information is capable of matching the reference anchor point information; and
  if it is determined that the first anchor point information matches the reference anchor point information, determining the three-dimensional relative position of the target object relative to the terminal as the first three-dimensional relative position according to the first anchor point information.

According to one or more embodiments of the present disclosure, there is provided an audio processing method, where the determining the three-dimensional relative position of the target object relative to the terminal as the first three-dimensional relative position according to the original image includes:
  if second anchor point information generated from an anchor point marking operation performed by a user on the original image is acquired, determining the three-dimensional relative position of the target object relative to the terminal as the first three-dimensional relative position according to the second anchor point information.

According to one or more embodiments of the present disclosure, there is provided an audio processing method, where the determining the three-dimensional relative position of the target object relative to the terminal as the first three-dimensional relative position according to the original image includes:
  if the target object does not exist in the original image, acquiring historical motion trajectory information corresponding to the target object, where the historical motion trajectory information is obtained by performing motion tracking on an image captured by the terminal before the original image is acquired; and
  determining the three-dimensional relative position of the target object relative to the terminal as the first three-dimensional relative position according to the historical motion trajectory information.

According to one or more embodiments of the present disclosure, there is provided an audio processing method, where the performing the three-dimensional effect processing on the target sound according to the first three-dimensional relative position to enable the sound source position of the target sound in the audio obtained after the three-dimensional effect processing and the first three-dimensional relative position to conform to the positional relationship between the target object and the sound effect object corresponding to the target object includes:
  determining the three-dimensional relative position of the sound source position of the target sound relative to the terminal as a second three-dimensional relative position according to the first three-dimensional relative position and the positional relationship between the target object and the sound effect object corresponding to the target object; and
  performing three-dimensional effect processing on the target sound according to the second three-dimensional relative position to enable the sound source position of the target sound in the audio obtained after the three-dimensional effect processing and the first three-dimensional relative position to conform to the positional relationship between the target object and the sound effect object corresponding to the target object.

According to one or more embodiments of the present disclosure, there is provided an audio processing method, the method further includes:

acquiring additional description information of the target sound, where the additional description information includes at least one of a sound source sounding area of the target sound, a sound source reverberation effect of the target sound and a sound source environment of the target sound;

the performing the three-dimensional effect processing on the target sound according to the second three-dimensional relative position to enable the sound source position of the target sound in the audio obtained after the three-dimensional effect processing and the first three-dimensional relative position to conform to the positional relationship between the target object and the sound effect object corresponding to the target object includes:

performing the three-dimensional effect processing on the target sound according to the second three-dimensional relative position and the additional description information to enable the sound source position of the target sound in the audio obtained after the three-dimensional effect processing and the first three-dimensional relative position to conform to the positional relationship between the target object and the sound effect object corresponding to the target object.

According to one or more embodiments of the present disclosure, there is provided an audio processing method, the method further includes:

superimposing image material corresponding to the target object to the first three-dimensional relative position of the original image to generate an AR image corresponding to the original image; and displaying the AR image.

According to one or more embodiments of the present disclosure, there is provided an audio processing method, the method further includes:

determining whether the terminal meets an ambisonic playing condition; and if it is determined that the terminal meets the ambisonic playing condition, playing the audio obtained after the three-dimensional effect processing.

According to one or more embodiments of the present disclosure, there is provided an audio processing apparatus, including:

a first acquiring module, configured to acquire an original image captured by a terminal;

a first determining module, configured to determine a three-dimensional relative position of a target object relative to the terminal as a first three-dimensional relative position according to the original image; and an audio processing module, configured to perform three-dimensional effect processing on a target sound according to the first three-dimensional relative position to enable a sound source position of the target sound in audio obtained after the three-dimensional effect processing and the first three-dimensional relative position to conform to a positional relationship between the target object and a sound effect object corresponding to the target object, where the target sound is an effect sound corresponding to the sound effect object.

According to one or more embodiments of the present disclosure, there is provided a computer readable storage medium having a computer program stored thereon, where the program, when executed by a processing apparatus, implements steps of the method described in any embodiment of the present disclosure.

According to one or more embodiments of the present disclosure, there is provided an electronic device, including:

a storage apparatus, having a computer program stored thereon; and a processing apparatus, configured to execute the computer program in the storage apparatus to implement steps of the method described in any embodiment of the present disclosure.

According to one or more embodiments of the present disclosure, there is provided a computer program product, where the program product includes a computer program, which, when executed by a processing apparatus, implements steps of the method described in any embodiment of the present disclosure.

According to one or more embodiments of the present disclosure, there is provided a computer program, which, when executed by a processing apparatus, implements steps of the method described in any embodiment of the present disclosure.

The above description is only a description of preferred embodiments of the present disclosure and applied technical principles. It should be understood by those skilled in the art that the disclosed scope involved in the present disclosure is not limited to the technical solutions formed by the specific combination of the above technical features, but also covers other technical solutions formed by any combination of the above technical features or equivalent features thereof without departing from the above disclosed concept, e.g., the technical solutions formed by replacing the above features with the technical features with similar functions disclosed in (but not limited to) the present disclosure.

In addition, although the operations are depicted in a particular order, it should not be understood as a requirement that those operations are performed in the particular order shown or in a sequential order. Under certain circumstances, multitasking and parallel processing may be advantageous. Similarly, although several specific implementation details are included in the above discussion, these should not be interpreted as limitations on the scope of the present disclosure. Certain features described in the context of a separate embodiment may also be implemented in a single embodiment in combination. On the contrary, various features described in the context of a single embodiment can also be implemented in multiple embodiments individually or in any suitable sub-combination.

Although the subject matter has been described in a language specific to structural features and/or logical actions of methods, it should be understood that the subject matter defined in the appended claims is not necessarily limited to the specific features or actions described above. On the contrary, the specific features and actions described above are merely exemplary forms for implementing the claims. With regard to the apparatuses in the above embodiments, the specific way in which each module performs operations has been described in detail in the embodiment of the method, and will not be explained in detail herein.

What is claimed is:
1. An audio processing method, comprising:
acquiring an original image captured by a terminal;

determining a three-dimensional relative position of a target object relative to the terminal as a first three-dimensional relative position according to the original image; and performing three-dimensional effect processing on a target sound according to the first three-dimensional relative position to enable a sound source position of the target sound in audio obtained after the three-dimensional effect processing and the first three-dimensional relative position to conform to a positional relationship between the target object and a sound effect object corresponding to the target object, wherein the target sound is an effect sound corresponding to the sound effect object;

wherein the sound effect object is in a different position as the target object;

wherein the determining the three-dimensional relative position of the target object relative to the terminal as the first three-dimensional relative position according to the original image comprises:

if the target object does not exist in the original image, acquiring historical motion trajectory information corresponding to the target object, wherein the historical motion trajectory information is obtained by performing motion tracking on an image captured by the terminal before the original image is acquired; and determining the three-dimensional relative position of the target object relative to the terminal as the first three-dimensional relative position according to the historical motion trajectory information.

2. The method according to claim 1, wherein the determining the three- dimensional relative position of the target object relative to the terminal as the first three-dimensional relative position according to the original image comprises:

performing feature extraction on the original image to acquire first anchor point information in the original image;

determining, according to pre-stored reference anchor point information corresponding to the target object, whether the first anchor point information is capable of matching the reference anchor point information; and if it is determined that the first anchor point information matches the reference anchor point information, determining the three-dimensional relative position of the target object relative to the terminal as the first three-dimensional relative position according to the first anchor point information.

3. The method according to claim 1, wherein the determining the three-dimensional relative position of the target object relative to the terminal as the first three-dimensional relative position according to the original image comprises:

if second anchor point information generated from an anchor point marking operation performed by a user on the original image is acquired, determining the three-dimensional relative position of the target object relative to the terminal as the first three-dimensional relative position according to the second anchor point information.

4. The method according to claim 1, wherein the performing the three-dimensional effect processing on the target sound according to the first three-dimensional relative position to enable the sound source position of the target sound in the audio obtained after the three-dimensional effect processing and the first three-dimensional relative position to conform to the positional relationship between the target object and the sound effect object corresponding to the target object comprises:

determining the three-dimensional relative position of the sound source position of the target sound relative to the terminal as a second three-dimensional relative position according to the first three-dimensional relative position and the positional relationship between the target object and the sound effect object corresponding to the target object; and performing three-dimensional effect processing on the target sound according to the second three-dimensional relative position to enable a sound source position of the target sound in audio obtained after the three-dimensional effect processing and the first three-dimensional relative position to conform to the positional relationship between the target object and the sound effect object corresponding to the target object.

5. The method according to claim 4, further comprising:

acquiring additional description information of the target sound, wherein the additional description information comprises at least one of a sound source sounding area of the target sound and a sound source environment of the target sound, wherein the sound source environment of the target sound is indoors or outdoors;

the performing the three-dimensional effect processing on the target sound according to the second three-dimensional relative position to enable the sound source position of the target sound in the audio obtained after the three-dimensional effect processing and the first three-dimensional relative position to conform to the positional relationship between the target object and the sound effect object corresponding to the target object, comprises:

performing the three-dimensional effect processing on the target sound according to the second three-dimensional relative position and the additional description information to enable the sound source position of the target sound in the audio obtained after the three-dimensional effect processing and the first three-dimensional relative position to conform to the positional relationship between the target object and the sound effect object corresponding to the target object.

6. The method according to claim 1, further comprising:

superimposing image material corresponding to the target object to the first three-dimensional relative position of the original image to generate an augmented reality (AR) image corresponding to the original image; and displaying the AR image.

7. The method according to claim 1, further comprising:

determining whether the terminal meets an ambisonic playing condition; and if it is determined that the terminal meets the ambisonic playing condition, playing the audio obtained after the three-dimensional effect processing.

8. An electronic device, comprising:

a storage apparatus, having a computer program stored thereon; and a processing apparatus, configured to execute the computer program in the storage apparatus to:

acquire an original image captured by a terminal;

determine a three-dimensional relative position of a target object relative to the terminal as a first three-dimensional relative position according to the original image; and perform three-dimensional effect processing on a target sound according to the first three-dimensional relative position to enable a sound source position of the target sound in audio obtained after the three-dimensional effect processing and the first three-dimensional relative position to conform to a positional relationship between the target object and a sound effect object corresponding to the target object, wherein the target sound is an effect sound corresponding to the sound effect object;

wherein the sound effect object is in a different position as the target object;

wherein the processing apparatus is configured to execute the computer program in the storage apparatus to:

acquire historical motion trajectory information corresponding to the target object if the target object does not exist in the original image, wherein the historical motion trajectory information is obtained by performing motion tracking on an image captured by the terminal before the original image is acquired; and determine the three-dimensional relative position of the target object relative to the terminal as the first three-dimensional relative position according to the historical motion trajectory information.

9. The electronic device according to claim 8, wherein the processing apparatus is configured to execute the computer program in the storage apparatus to:

perform feature extraction on the original image to acquire first anchor point information in the original image;

determine, according to pre-stored reference anchor point information corresponding to the target object, whether the first anchor point information is capable of matching the reference anchor point information; and determine the three-dimensional relative position of the target object relative to the terminal as the first three-dimensional relative position according to the first anchor point information if it is determined that the first anchor point information matches the reference anchor point information.

10. The electronic device according to claim 8, wherein the processing apparatus is configured to execute the computer program in the storage apparatus to:

determine the three-dimensional relative position of the target object relative to the terminal as the first three-dimensional relative position according to second anchor point information if the second anchor point information generated from an anchor point marking operation performed by a user on the original image is acquired.

11. The electronic device according to claim 8, wherein the processing apparatus is configured to execute the computer program in the storage apparatus to:

determine the three-dimensional relative position of the sound source position of the target sound relative to the terminal as a second three-dimensional relative position according to the first three-dimensional relative position and the positional relationship between the target object and the sound effect object corresponding to the target object; and perform three-dimensional effect processing on the target sound according to the second three-dimensional relative position to enable a sound source position of the target sound in audio obtained after the three-dimensional effect processing and the first three-dimensional relative position to conform to the positional relationship between the target object and the sound effect object corresponding to the target object.

12. The electronic device according to claim 11, wherein the processing apparatus is further configured to execute the computer program in the storage apparatus to:

acquire additional description information of the target sound, wherein the additional description information comprises at least one of a sound source sounding area of the target sound and a sound source environment of the target sound, wherein the sound source environment of the target sound is indoors or outdoors;

perform the three-dimensional effect processing on the target sound according to the second three-dimensional relative position and the additional description information to enable the sound source position of the target sound in the audio obtained after the three-dimensional effect processing and the first three-dimensional relative position to conform to the positional relationship between the target object and the sound effect object corresponding to the target object.

13. The electronic device according to claim 8, wherein the processing apparatus is further configured to execute the computer program in the storage apparatus to:

superimpose image material corresponding to the target object to the first three-dimensional relative position of the original image to generate an augmented reality (AR) image corresponding to the original image; and display the AR image.

14. The electronic device according to claim 8, wherein the processing apparatus is further configured to execute the computer program in the storage apparatus to:

determine whether the terminal meets an ambisonic playing condition; and play the audio obtained after the three-dimensional effect processing if it is determined that the terminal meets the ambisonic playing condition.

15. A non-transitory computer readable storage medium having a computer program stored thereon, wherein the program, when executed by a processing apparatus, is configured to:

acquire an original image captured by a terminal;

determine a three-dimensional relative position of a target object relative to the terminal as a first three-dimensional relative position according to the original image; and perform three-dimensional effect processing on a target sound according to the first three-dimensional relative position to enable a sound source position of the target sound in audio obtained after the three-dimensional effect processing and the first three-dimensional relative position to conform to a positional relationship between the target object and a sound effect object corresponding to the target object, wherein the target sound is an effect sound corresponding to the sound effect object;

wherein the sound effect object is in a different position as the target object;

wherein the program. when executed by a processing apparatus, is configured to:

acquire historical motion trajectory information corresponding to the target object if the target object does not exist in the original image, wherein the historical motion trajectory information is obtained by performing motion tracking on an image captured by the terminal before the original image is acquired; and determine the three-dimensional relative position of the target object relative to the terminal as the first three-dimensional relative position according to the historical motion trajectory information.

16. The non-transitory computer readable storage medium according to claim 15, wherein the program, when executed by the processing apparatus, is configured to:
- perform feature extraction on the original image to acquire first anchor point information in the original image;
- determine, according to pre-stored reference anchor point information corresponding to the target object, whether the first anchor point information is capable of matching the reference anchor point information; and
- determine the three-dimensional relative position of the target object relative to the terminal as the first three-dimensional relative position according to the first anchor point information if it is determined that the first anchor point information matches the reference anchor point information.

17. The non-transitory computer readable storage medium according to claim 15, wherein the program, when executed by the processing apparatus, is configured to:
- determine the three-dimensional relative position of the target object relative to the terminal as the first three-dimensional relative position according to second anchor point information if the second anchor point information generated from an anchor point marking operation performed by a user on the original image is acquired.

* * * * *